(12) United States Patent
Guillot et al.

(10) Patent No.: US 8,456,869 B2
(45) Date of Patent: Jun. 4, 2013

(54) AC/DC CONVERTER HAVING ISOLATING TRANSFORMER WITH THREE SECONDARY WINDINGS

(75) Inventors: François Guillot, Paris (FR); Jean-Marie Courteille, Paris (FR)

(73) Assignee: Sagem Defense Securite, Paris (FR)

( * ) Notice: Subject to any disclaimer, the term of this patent is extended or adjusted under 35 U.S.C. 154(b) by 358 days.

(21) Appl. No.: 12/744,726

(22) PCT Filed: Dec. 9, 2008

(86) PCT No.: PCT/FR2008/001710
§ 371 (c)(1),
(2), (4) Date: May 26, 2010

(87) PCT Pub. No.: WO2009/101300
PCT Pub. Date: Aug. 20, 2009

(65) Prior Publication Data
US 2010/0309696 A1    Dec. 9, 2010

(30) Foreign Application Priority Data

Dec. 19, 2007 (FR) ...................................... 07 08909

(51) Int. Cl.
*H02M 3/335* (2006.01)
(52) U.S. Cl.
USPC ..................................... 363/21.04; 363/21.12

(58) Field of Classification Search
USPC .................................... 363/21.04, 21.12, 124
See application file for complete search history.

(56) References Cited

U.S. PATENT DOCUMENTS

| | | | |
|---|---|---|---|
| 5,973,939 A * | 10/1999 | Tan | 363/21.06 |
| 2005/0088858 A1* | 4/2005 | Kogel et al. | 363/22 |
| 2008/0298095 A1* | 12/2008 | Chuang et al. | 363/21.12 |

FOREIGN PATENT DOCUMENTS

| | | |
|---|---|---|
| EP | 0 475 296 | 3/1992 |
| JP | 06 078542 | 3/1994 |
| JP | 08 237951 | 9/1996 |

* cited by examiner

*Primary Examiner* — Adolf Berhane
*Assistant Examiner* — Emily Pham
(74) *Attorney, Agent, or Firm* — Muncy, Geissler, Olds & Lowe, PLLC

(57) ABSTRACT

An AC/DC converter has at its input a rectifier circuit connected in series with a primary winding of an isolating transformer and with a chopper switch (T1) connected to a pulse width modulation control circuit. The isolating transformer has a first secondary winding wound in the same direction as the primary winding and connected to an output line of the converter via a diode (D4). The output line is connected to an output capacitor ($C_{out}$), wherein the isolating transformer has a second secondary winding that is wound in the opposite direction to the primary winding and that is connected directly to the output line via a diode (D2).

6 Claims, 1 Drawing Sheet

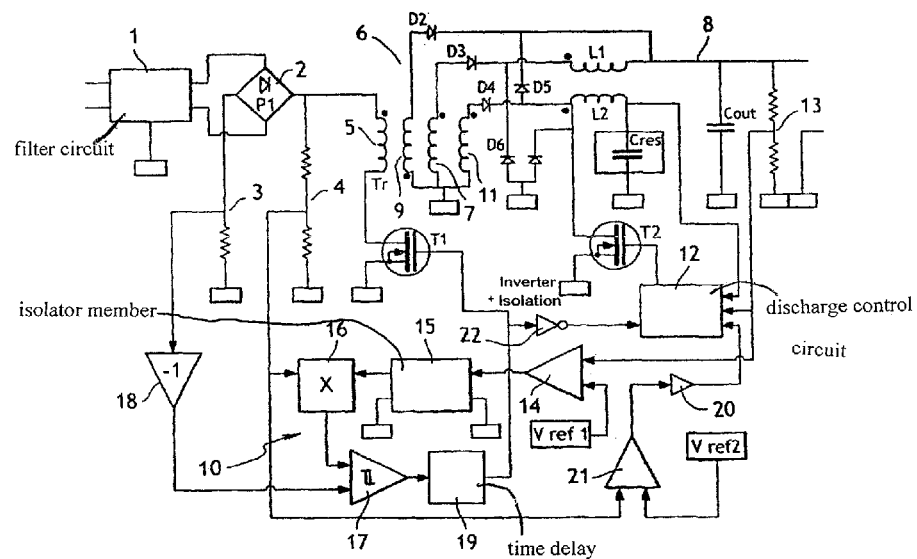

AC/DC CONVERTER HAVING ISOLATING TRANSFORMER WITH THREE SECONDARY WINDINGS

The present invention relates to an electrically-isolated alternating current/direct current (AC/DC) converter, e.g. suitable for use in the electricity distribution network of an aircraft.

BACKGROUND OF THE INVENTION

In an airplane, electricity is supplied by an alternator that is driven by the engine of the airplane. The alternator delivers an alternating voltage that is converted into a DC voltage for use by on-board electrical equipment in the airplane.

In its simplest version, conversion is performed by means of a transformer having a primary winding connected to the alternator and a secondary winding connected to a rectifier bridge associated with a filter capacitor. The output voltage from the rectifier bridge is a fullwave rectified sinewave, and current consumption is subjected to a high level of distortion that gives rise to a drop in the efficiency of the transformer and of the alternator, to heating of the conductors, and to high-frequency electromagnetic radiation that gives rise to interference.

One way of remedying that drawback is to provide filtering in series with the primary circuit of the transformer. Nevertheless, that option is not appropriate when the frequency of the alternating voltage is variable, as happens with an alternator driven by a jet turbine for which the frequency varies over the range 360 hertz (Hz) to 800 Hz, approximately.

It is also known to have recourse to a power factor corrector (PFC) circuit for reducing distortion by forcing current consumption to follow a waveform identical to that of the input voltage, i.e. a fullwave rectified sinewave. There are various different structures of PFC.

In a "boost" type structure, the circuit does not have electrical isolation which makes it necessary to associate the circuit with a DC/DC converter that provides this function. That assembly provides overall efficiency that is relatively low, and also high levels of bulk and weight.

In the so-called "flyback" type structure, the circuit includes an isolating transformer with primary and secondary windings wound in opposite directions. The operation of PFC circuits of this type leads periodically to a large quantity of energy being stored in the magnetic core of the transformer. It is therefore necessary to use large transforms for high powers, thereby increasing the weight and the bulk of the circuit.

In the structure of the so-called "forward" type, the circuit also includes an isolating transformer, but the primary and secondary windings are wound in the same direction. In this type of circuit, it is not possible to make use of the current over all of the resulting sinewave and thus to consume current with the same waveform as the input voltage.

OBJECT OF THE INVENTION

An object of the invention is to propose a converter structure having improved performance.

SUMMARY OF THE INVENTION

To this end, the invention provides an AC/DC converter comprising at its input a rectifier circuit connected in series with a primary winding of an isolating transformer and with a chopper switch connected to a pulse width modulation control circuit, the isolating transformer having a first secondary winding wound in the same direction as the primary winding and connected to an output line of the converter via a diode and a filter coil, the output line being connected to an output capacitor, the isolating transformer including a second secondary winding that is wound in the opposite direction to the primary winding and that is connected directly to the output line via a diode. Thus, for medium to high voltages, energy is transferred towards the output via the first secondary winding, the diode, and the filter coil. This enables high powers to be passed. In contrast, when the voltage is low, the energy stored in the magnetic core of the transformer may be transferred, when the chopper switch is switched on, to the output capacitor via the second secondary winding and the associated diode. The second secondary winding thus enables the energy stored in the magnetic core to be delivered to the output and therefore avoids energy being wasted. It also makes it possible to ensure energy consumption, used at the output, when voltages are low (the low-amplitude portion of the sinewave). Furthermore, the residual flux present in the core when the chopper switch is switched on excites the second secondary winding, which delivers the corresponding energy to the output, thereby minimizing the appearance of surges when the chopper switch is switched on, which surges would run the risk of damaging the chopper switch. A single converter stage thus enables electrical isolation to be achieved and also provides a PFC function in a manner that is particularly simple, reliable, and effective, because of relatively high efficiency.

According to a particular characteristic, the converter includes a reserve supply of energy comprising a third secondary winding of the isolating transformer that is wound in the same direction as the primary winding and that is connected firstly to a filter coil and an energy storage capacitor, and secondly to the output line via a power switch controlled by a discharge control circuit as a function of a level of charge in the energy storage capacitor.

A reserve supply of energy is thus incorporated in the converter circuit without excessively increasing its weight and size, with minimal degradation of its efficiency.

Other characteristics and advantages of the invention appear on reading the following description of a particular, non-limiting embodiment of the invention.

BRIEF DESCRIPTION OF THE DRAWING

Reference is made to the sole accompanying figure, which is a schematic of the circuit of a converter in accordance with the invention.

DETAILED DESCRIPTION OF THE INVENTION

With reference to the figure, the converter in accordance with the invention is for connection to an AC electricity distribution network, and on its output side to at least one piece of electronic equipment that is DC powered.

The converter comprises, at its input, a filter circuit 1, known in itself, that is connected to a rectifier circuit 2. The rectifier circuit 2 is likewise known in itself and is constituted in this example by a diode bridge having input terminals connected to the filter circuit 1, a first output terminal connected to a current-measuring shunt 3, and a second output terminal connected firstly to a divider bridge 4, and secondly to a primary winding 5 of an isolating transformer 6 connected in series with a chopper switch T1. The chopper switch T1 is a power transistor such as a metal oxide semiconductor field effect transistor (MOSFET) or an insulated gate bipolar transistor (IGBT). The chopper switch T1 is connected to a control circuit, or more precisely to a chopper control circuit 10, as described below.

The isolating transformer 6 possesses a first secondary winding 7 wound in the same direction as the primary winding 5 and connected in series with an output line 8 of the converter via a diode D3 and a filter coil L1 (commonly referred to as an inductor). A freewheel diode D6 connects ground to the filter coil L1 in known manner to provide current continuity when the diode D3 is not conducting (energy delivered by the filter coil L1).

The isolating transformer 6 possesses a second secondary winding 9 wound in the opposite direction to the primary winding 5 and connected via a diode D2 directly to the output line 8, i.e. downstream from the coil L1.

The isolating transformer 6 possesses a third secondary winding 11 wound in the same direction as the primary winding 5 and connected via a diode D4:
 to the output line 8;
 to a filter coil L2 that is coupled to the filter coil L1 and that is connected in series with an energy-storage capacitor $C_{res}$; and
 a discharge switch T2 controlled by a discharge control circuit 12 as a function of the level of charge in the energy storage capacitor $C_{res}$.

The energy storage capacitor $C_{res}$ is a supercapacitor of very high capacitance, of the order of a few hundreds of farads. The capacitance and the number of energy storage capacitors are determined as a function of the quantity of energy it is desired to have available in the event of the power supply being interrupted.

The discharge switch T2 is of the same type as the chopper switch T1.

The output line 8 is also connected to an output capacitor $C_{out}$ and to a divider bridge 13.

The chopper control circuit 10 is a pulse width modulator control circuit arranged to control the chopper switch T1 as a function of a comparison between a voltage that is the image of current being consumed at the input to the converter and a signal in the form of a fullwave rectified sinewave of amplitude that depends on an error voltage between an output voltage of the converter and a reference voltage.

The chopper control circuit 10 comprises a comparator 14 having one input connected to the divider bridge 13 that is connected to the output line 8, and another input connected to a source of a reference voltage Vref1. The comparator 14 has an output connected via an isolator member 15 (here an opto-electronic coupler) to a first input of a multiplier 16 having a second input connected to the divider bridge 4. The multiplier 16 has an output connected to a first input of a hysteresis comparator 17 with a second input connected to the measurement shunt 3 via an inverter 18 so as to receive a voltage that is an image of the current being consumed, and an output connected via a time delay 19 to a control input (grid) of the chopper switch Ti.

The discharge control circuit 12 possesses:
 an input connected via an inverter 20 to an output of a comparator 21 having a first input connected to the divider bridge 4 to receive a voltage representative of the output voltage from the rectifier circuit 2, and a second input connected to a source of a reference voltage Vref2 to provide the discharge control circuit 12 with an error voltage between the voltage present at the output from the rectifier circuit 12 and the reference voltage Vref2 (the purpose being to detect failure of the power supply network);
 an input connected to the filter coil L2 and to the energy storage capacitor $C_{res}$ (for measuring the reserve voltage);
 an input connected to the divider bridge 13 (for measuring the output voltage);
 an input connected via an inverter and isolator member 22 (an inverter associated with an opto-electronic coupler) to the output from the time delay 19 (to prevent the discharge switch T2 being operated when the chopper switch T1 is conductive); and
 an output connected to the control input (the grid) of the discharge switch T2.

The operation of the converter in accordance with the invention is described below.

In the example described, the isolating transformer 6 has a transformation ratio of 1.5.

The principle of the converter consists in applying pulse width modulation control to the chopper switch T1 so as to force current consumption to follow a waveform identical to that of the voltage, i.e. a fullwave rectified sinewave.

For this purpose, the signal from the divider bridge 4, representing the voltage at the output from the rectifier circuit 2 (fullwave rectified sinewave) is multiplied in the multiplier 16 by a signal representative of an error voltage that results from the comparator 14 comparing the output voltage from the divider bridge 13 with the reference voltage Vref1. The product of these signals is a signal having a fullwave rectified sinewave waveform of amplitude that depends on the error in the output voltage.

This signal is compared, with hysteresis, by the hysteresis comparator 17 to a voltage that is the image of current consumption as sensed by the measurement shunt 3. The signal output by the hysteresis comparator 17 is applied, after a time delay, to the grid of the chopper switch T1.

Thus, when the current is less than the error voltage, the chopper switch T1 is conductive (ON), whereas when the current is greater than the error voltage, the chopper switch T1 is non-conductive (OFF).

When the chopper switch T1 is switched on while the voltage is low (output voltage below a threshold equal to the product of the input voltage multiplied by the transformation ratio, i.e. 1.5), then the energy stored in the magnetic core of the isolating transformer 6 excites the second secondary winding 9 and is transmitted to the output line 8 via the diode D2. The operation of the converter is then similar to that of a flyback type converter, thereby enabling energy consumption by the output to take place during low-amplitude phases in the rectified sinewave voltage.

When the output voltage has increased up to a threshold equal to the product of the input voltage multiplied by the transformation ratio, the diode D3 conducts, and the energy of the magnetic core is transferred to the output line via the first winding 7, the diode D3, and the filter coil L1. The operation of the converter is then similar to that of a forward type converter. The converter then also has a flyback type minority operating mode that contributes to fully discharging the magnetic core of the isolating transformer.

This thus constitutes a self-oscillating system that is servo-controlled on the amplitude of the error voltage, that is itself in the form of a fullwave rectified sinewave, thus making it possible to obtain an output voltage that is accurate and current consumption that is sinusoidal.

The energy storage capacitor $C_{res}$ is charged (while the converter is operating in a forward type mode of operation) via the third secondary winding 11 and the diode D4. The coupled-together filter coils L1 and L2 serve to limit the charging current peak and to provide approximate regulation of the charging voltage.

Failure of the power supply voltage is detected by the discharge control circuit 12 that controls the discharge switch T2 by applying pulse width modulation. The assembly comprising the filter coil L2 and the energy storage capacitor $C_{res}$ then operates as a voltage booster with a resultant value that is servo-controlled to the normal operation setpoint value. The discharge control circuit 12 is arranged to adjust the duty ratio of its control signal to the level of charge in the energy storage capacitor $C_{res}$.

Naturally, the invention is not limited to the embodiment described, but covers any variant coming within the ambit of the invention as defined by the claims.

In particular, the reserve supply of energy is optional.

The invention claimed is:

1. An AC/DC converter comprising at its input a rectifier circuit connected in series with a primary winding of an isolating transformer and with a chopper switch (T1) connected to a pulse width modulation control circuit, the isolating transformer having a first secondary winding wound in the same direction as the primary winding and connected to an output line of the converter via a diode (D4) and a filter coil (L1), the output line being connected to an output capacitor ($C_{out}$), wherein the isolating transformer has a second secondary winding that is wound in the opposite direction to the primary winding and that is connected directly to the output line via a diode (D2) and the isolating transformer has a third secondary winding that is wound in the same direction as the primary winding and that is connected firstly to a filter coil (L2) and an energy storage capacitor ($C_{res}$), and secondly to the output line via a power switch (T2) controlled by a discharge control circuit as a function of a level of charge in the energy storage capacitor.

2. The converter according to claim 1, wherein the pulse width modulation control circuit is arranged to control a power switch as a function of a comparison between a voltage that is an image of current consumed at the input of the converter and a signal in the form of a fullwave rectified sinewave of amplitude that depends on an error voltage between an output voltage of the converter and a reference voltage (Vref1).

3. The converter according to claim 2, wherein the pulse width modulation control circuit of the chopper switch (T1) includes a comparator having inputs connected to the output line and to a source of a reference voltage (Vref1), and an output connected to a first input of a multiplier having a second input receiving an output voltage from the rectifier circuit, and an output connected to a first input of a hysteresis comparator having a second input receiving a voltage that is the image of the current consumed, and an output connected via a time delay to a control input of the chopper switch.

4. The converter according to claim 1, further including a comparator having a first input receiving an output voltage of the rectifier circuit and a second input connected to a source of a reference voltage (Vref2), and an output connected to the discharge control circuit.

5. The converter according to claim 4, wherein the discharge control circuit further comprises:
   an input connected to the filter coil (L2) and to the energy storage comparator ($C_{res}$);
   an input connected to the output line;
   an input connected via an inverter and isolating member to the output of the time delay; and
   an output connected to the control input of the power switch (T2).

6. The converter according to claim 1, further including a filter circuit upstream from the rectifier circuit.

* * * * *